United States Patent
Chayat et al.

(10) Patent No.: US 11,108,428 B2
(45) Date of Patent: Aug. 31, 2021

(54) REFERENCE SIGNAL DISTRIBUTION IN MULTI-MODULE SYSTEMS

(71) Applicant: VAYYAR IMAGING LTD., Yehud (IL)

(72) Inventors: Naftali Chayat, Kfar Saba (IL); Jonathan Rosenfeld, Ramat Hasharon (IL)

(73) Assignee: VAYYAR IMAGING LTD., Yehud (IL)

( * ) Notice: Subject to any disclaimer, the term of this patent is extended or adjusted under 35 U.S.C. 154(b) by 0 days.

(21) Appl. No.: 17/067,893

(22) Filed: Oct. 12, 2020

(65) Prior Publication Data

US 2021/0028812 A1   Jan. 28, 2021

Related U.S. Application Data (60) Continuation of application No. 16/704,009, filed on Dec. 5, 2019, now Pat. No. 10,804,954, which is a continuation of application No. 16/008,068, filed on Jun. 14, 2018, now abandoned, which is a division of application No. 15/473,884, filed on Mar. 30, 2017, now Pat. No. 10,020,836, which is a continuation of application No. PCT/IL2015/050973, filed on Sep. 24, 2015.

(60) Provisional application No. 62/057,286, filed on Sep. 30, 2014.

(51) Int. Cl.
| | | |
|---|---|---|
| H04B 1/48 | (2006.01) | |
| H04B 17/12 | (2015.01) | |
| H04B 17/14 | (2015.01) | |
| H04B 17/21 | (2015.01) | |

(52) U.S. Cl.
CPC ............... *H04B 1/48* (2013.01); *H04B 17/12* (2015.01); *H04B 17/14* (2015.01); *H04B 17/21* (2015.01)

(58) Field of Classification Search
CPC .......... H04B 1/48; H04B 17/12; H04B 17/14; H04B 17/15; H04B 17/19; H04B 17/21
See application file for complete search history.

(56) References Cited

U.S. PATENT DOCUMENTS

| | | |
|---|---|---|
| 8,705,654 B1 | 4/2014 | Khlat et al. |
| 2002/0039889 A1 | 4/2002 | Boos |
| 2003/0038618 A1 | 2/2003 | Gumm |
| 2005/0090212 A1 | 4/2005 | Earls et al. |
| 2006/0121871 A1 | 6/2006 | Kim |

(Continued)

FOREIGN PATENT DOCUMENTS

| | | |
|---|---|---|
| JP | 2000-013255 A | 1/2000 |
| JP | 2003-273818 A | 9/2003 |

(Continued)

OTHER PUBLICATIONS

International Search Report for PCT Application dated Jan. 19, 2017.

*Primary Examiner* — Nguyen T Vo
(74) *Attorney, Agent, or Firm* — Mark Cohen; Pearl Cohen Zedek Latzer Baratz (57) ABSTRACT

Systems of multiple transmitters and multiple receivers, allowing receivers to identify the transmitters from which reference signals originate. Identification is according to frequency offset patterns based on transmitter and local oscillator frequencies, and is particularly suitable in radio-frequency integrated-circuit devices and MIMO radar systems.

19 Claims, 5 Drawing Sheets

(56) References Cited

U.S. PATENT DOCUMENTS

| | | | |
|---|---|---|---|
| 2008/0012748 A1* | 1/2008 | Ahn | H04B 17/21 |
| | | | 342/21 |
| 2008/0139143 A1* | 6/2008 | Roufoogaran | H03G 3/30 |
| | | | 455/126 |
| 2009/0116374 A1 | 5/2009 | Henriksson et al. | |
| 2009/0315761 A1 | 12/2009 | Walter et al. | |
| 2010/0056083 A1 | 3/2010 | Kim et al. | |
| 2011/0271155 A1 | 11/2011 | Tran | |
| 2012/0309328 A1 | 12/2012 | Morrison et al. | |
| 2013/0158933 A1* | 6/2013 | Huang | G01R 31/2822 |
| | | | 702/122 |

FOREIGN PATENT DOCUMENTS

| | | |
|---|---|---|
| JP | 2012-068224 A | 4/2012 |
| JP | 2012-068224 A | 5/2012 |
| JP | 2013-231636 A | 11/2013 |

* cited by examiner

REFERENCE SIGNAL DISTRIBUTION IN MULTI-MODULE SYSTEMS

This application is a Continuation Application of U.S. patent application Ser. No. 16/704,009, titled 'Reference signal distribution in multi-module systems', filed Dec. 5, 2019, which is a Continuation Application of U.S. patent application Ser. No. 16/008,068, filed Jun. 14, 2018, titled 'Reference signal distribution in multi-module systems', which is a Divisional Application of U.S. patent application Ser. No. 15/473,884, filed Mar. 30, 2017, titled 'Reference signal distribution in multi-module systems', which is a continuation of PCT International Application No. PCT/IL2015/050973, International Filing Date Sep. 24, 2015, claiming priority of U.S. Provisional Patent Application No. 62/057,286, filed Sep. 30, 2014.

FIELD

The present invention is directed to multi-module radio-frequency calibration, in particular to the calibration of radio frequency integrated circuits (RFIC).

BACKGROUND

Multi-module systems typically require sharing of frequency and phase reference signals for real-time calibration. In such systems, it is desirable to measure transmission characteristics between arbitrarily-selected ports of the modules. For example, in a phased-array radar system it is necessary to know the relative phase characteristics at the respective antennas in order to be able to direct a phased beam in a particular direction. In another example, multiple input/multiple output (MIMO) radar systems require referencing received signals to one another.

Under ideal conditions, measurement of reference signals is generally straightforward. When transmission losses are high, however, signal leakage among module ports interferes with reference measurement. For example, when making multi-port measurements with a vector network analyzer (VNA) there is typically some signal leakage between the VNA's ports, which limits the dynamic range of the measurements. This problem is particularly pronounced in the case of a single RFIC, where the isolation is limited because of the small inter-port distances and the inherently-restricted isolation of the RFIC, the package, and the printed circuit board (PCB). Here, the likely limit for isolation is on the order of 50 dB, achieved between the most distantly-separated RFIC ports.

A known improvement to the above-described isolation problem is to use a separate shielded RFIC for each port. In this way, the signal transmitted to the device (or medium) under test (hereinafter denoted as "DUT") has a significantly better isolation, and only the signal passing through the DUT reaches the other RFIC. Unfortunately, however, this introduces the problem of providing a phase reference to the mated RFIC. RFICs may have distinct synthesizers, so the phase of a signal from one RFIC downconverted within another RFIC cannot be directly measured—only comparative measurements can be made. This requires that a sample of the reference signal be provided to the receiving RFIC. The straightforward approach for providing the reference is to bring a sample of the transmitted signal to the receiving RFIC via a receiving port, and then measure the phase difference between the signal from the DUT and the reference signal from the transmitting RFIC. However, bringing a signal at the test frequency can contaminate the signal from the DUT, because the receiving RFIC has limited isolation. The problem could be lessened by weakening the reference signal, but doing so also reduces measurement accuracy because of the degraded signal-to-noise ratio of the reference.

Under the conditions and restrictions described above, it would be desirable to have methods for reducing or eliminating signal leakage; reducing or eliminating the affects of signal leakage on measurements; and making accurate measurements in spite of signal leakage. These goals are met by embodiments of the present invention.

SUMMARY

Various embodiments of the present invention provide efficient and ordered distribution of reference signals in RF systems having multiple receivers and transmitters. These embodiments provide reference sharing among the different ports of the modules, in configurations including, but not limited to: a star coupler featuring all-to-all reference coupling; and neighboring module-to-module reference sharing.

In addition, certain embodiments of the present invention provide isolation for reference signals that are being shared among modules, by furnishing each reference signal with a unique signature, allowing individual reference signals to be identified and separated as necessary throughout the system. According to various embodiments of the invention, signatures can be applied via frequency-shifting or binary phase-shift encoding.

Therefore, according to an embodiment of the present invention there is provided a radio-frequency transmitter-receiver system including: (a) a transmitter for transmitting a transmitted signal at a transmission frequency; (b) a receiver for receiving the transmitted signal as a received transmitted signal, wherein: (c) the receiver includes a local oscillator having a local oscillator signal at a local oscillator frequency, for downconverting the received transmitted signal from the transmission frequency to an intermediate frequency as a receiver intermediate frequency signal; (d) a transmitter downconverter associated with the transmitter, for downconverting the transmitted signal from the transmission frequency to the intermediate frequency as a transmitter intermediate frequency signal; (e) a reference signal path from the local oscillator to the transmitter downconverter, for conveying the local oscillator signal from the local oscillator to the transmitter downconverter; and (f) a phase comparator, for measuring a phase difference between the receiver intermediate frequency signal and the transmitter intermediate frequency signal.

In addition, according to another embodiment of the present invention, there is also provided a method for calibrating a radio-frequency transmitter-receiver system having a transmitter with a transmitted signal, a receiver with a local oscillator signal and a receiver intermediate frequency signal, and a transmitter downconverter, the method including: (a) downconverting the transmitted signal via the downconverter to a transmitter intermediate frequency signal according to the local oscillator signal; (b) measuring a phase difference between the receiver intermediate frequency signal and the transmitter intermediate frequency signal; and (c) calibrating the transmitter-receiver system according to the phase difference.

BRIEF DESCRIPTION OF THE DRAWINGS

The subject matter disclosed may best be understood by reference to the following detailed description when read with the accompanying drawings in which.

Figure 1:
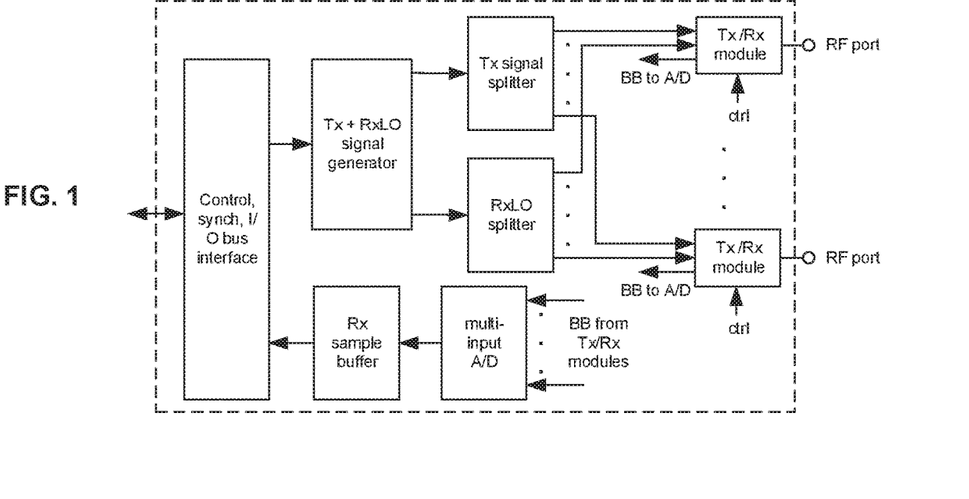
FIG. 1 is a top-level block diagram of a radio-frequency integrated circuit (RFIC).
Figure 2:
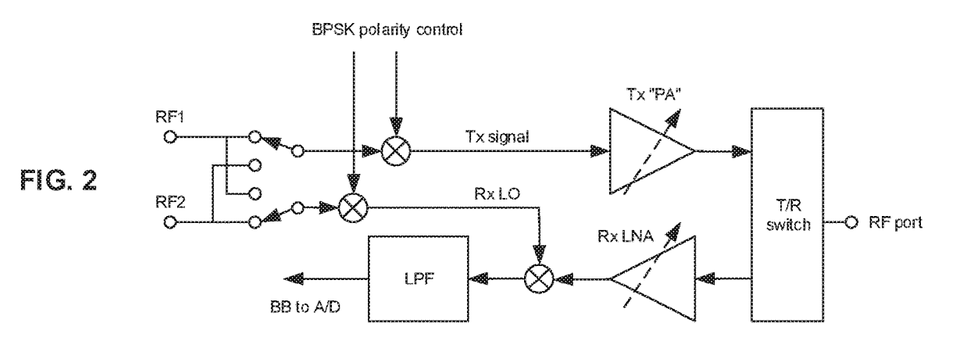
FIG. 2 is a block diagram of an exemplary transmit/receive module.
Figure 3:
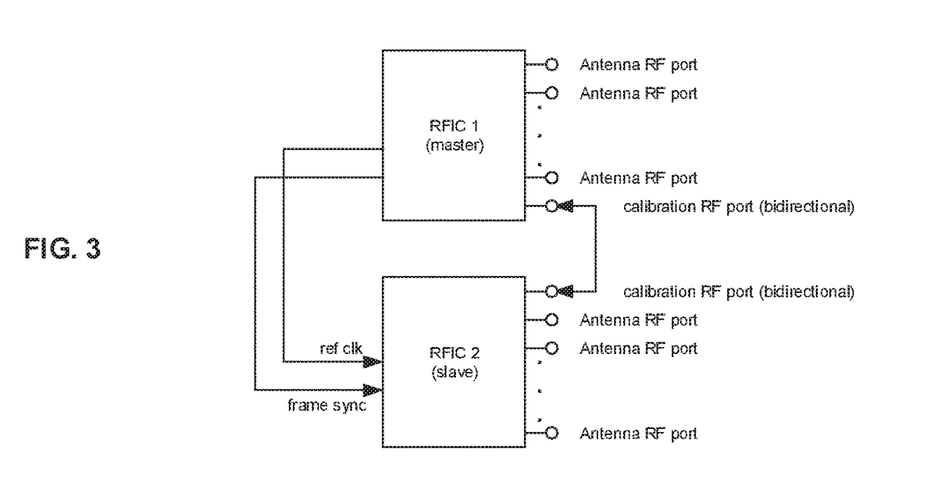
FIG. 3 is a block diagram of a system of two RFICs.
Figure 4A:
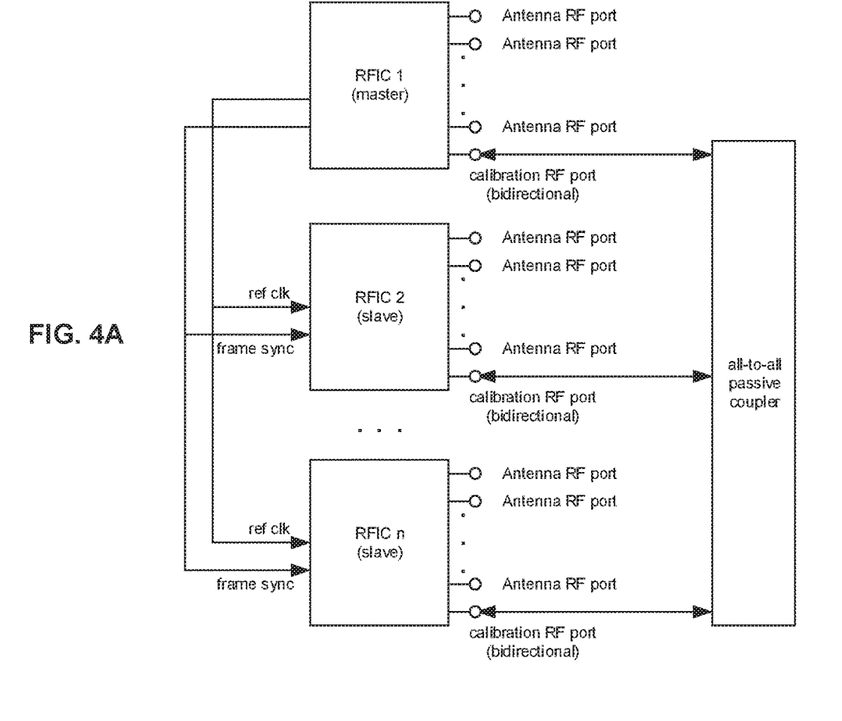
FIG. 4A is a block diagram of a multi-module RFIC system having bidirectional ports used for calibration.
Figure 4B:
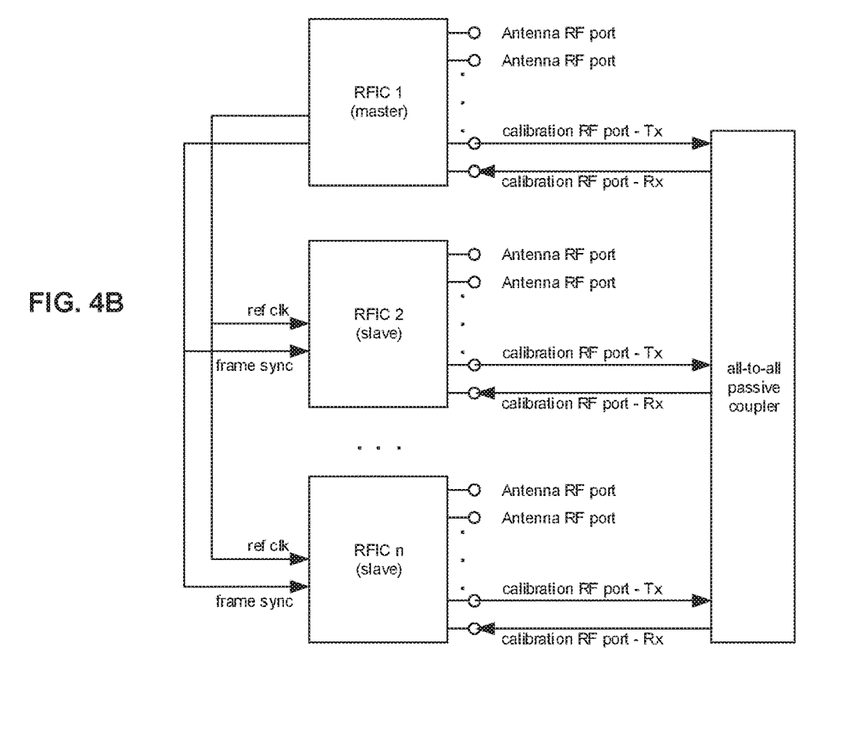
FIG. 4B is a block diagram of a multi-module RFIC system having dedicated ports used for calibration.
Figure 5A:
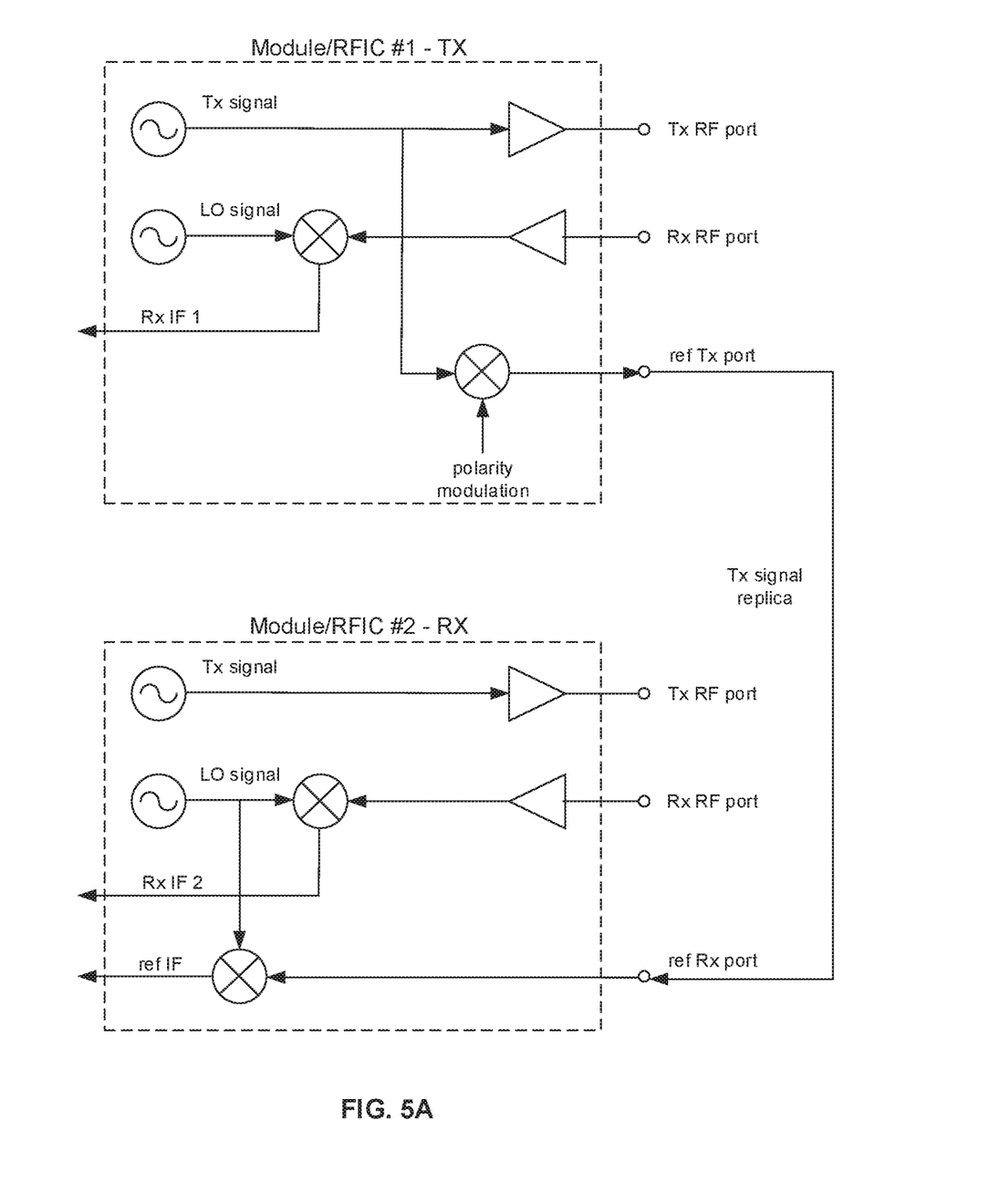
FIG. 5A is a block diagram showing a reference signal sent from a transmitting module to a receiving module.
Figure 5B:
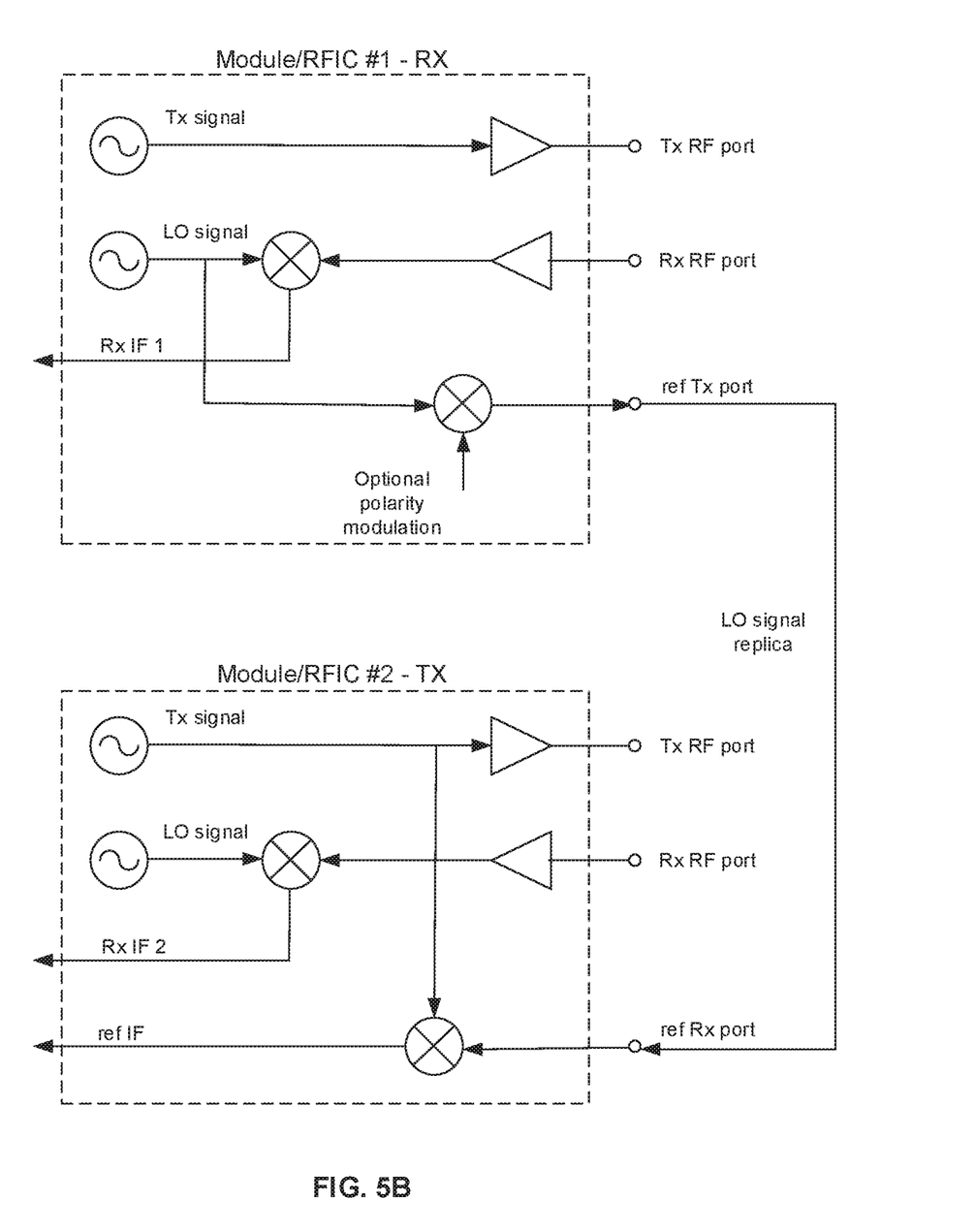
FIG. 5B is a block diagram showing a reference signal sent from a receiving module to a transmitting module.
Figure 6A:
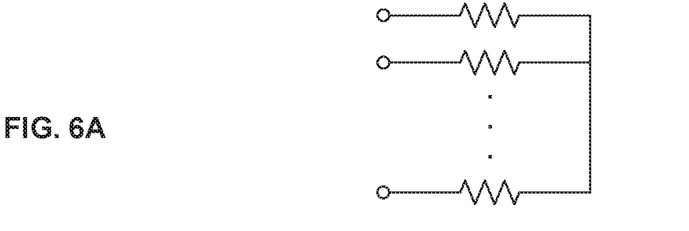
FIG. 6A is a schematic diagram of a simplified all-to-all symmetric star coupler.
Figure 6B:
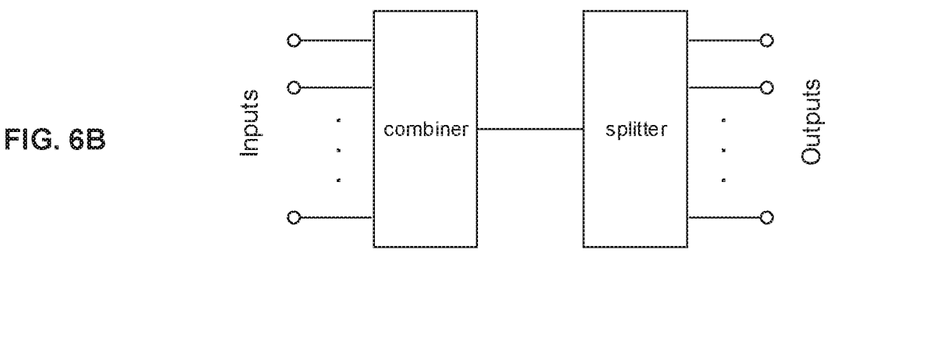
FIG. 6B is a block diagram of a symmetric all-to-all reference signal distributor.
Figure 6C:
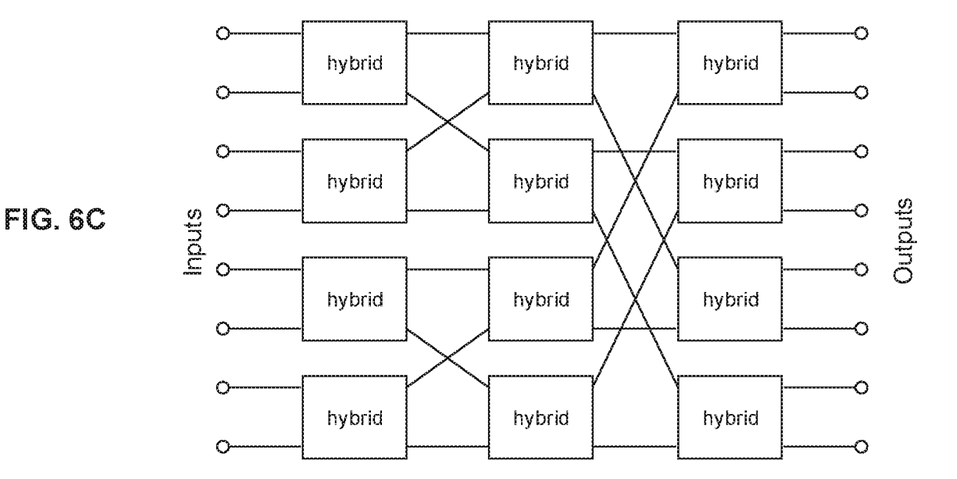
FIG. 6C is a block diagram of an exemplary 8-port all-to-all Butler/Hadamard coupler.

For simplicity and clarity of illustration, elements shown in the figures are not necessarily drawn to scale, and the dimensions of some elements may be exaggerated relative to other elements. In addition, reference labels may be repeated among the figures to indicate corresponding or analogous elements.

DETAILED DESCRIPTION

Certain embodiments of the present invention provide a reference signal that is distinct from the transmitted signal, so that leakage of the reference signal into the signal from the DUT does not cause a measurement error. In some of these embodiments, the reference signal is mathematically orthogonal to the transmitted signal. According to a related embodiment, orthogonality is attained by frequency offsetting; according to another related embodiment, orthogonality is attained by binary phase shift keying (BSPK), either fast or slow.

In one embodiment, the transmitting RFIC conveys the reference to other RFICs using BPSK (a non-limiting example of which uses 1 MHz modulation). The signal to the DUT is sent as a continuous wave (CW). As a result, the reference signal contains no spectral component at 0 Hz (DC). The receiving RFICs receive both the CW signal from the DUT (on one of the ports) and the BPSK-modulated signal (on another port). The reference signal is BPSK-demodulated, downconverted and integrated in software so as to obtain the reference phasor. Because the reference and the DUT signals are orthogonal, there is no mutual contamination. The BPSK modulation can be implemented through BPSK toggling at the TR module sending the reference (though it can introduce noise)—modulation through arbitrary waveform generation (AWG) is not an option since $RFIC_1$ is dedicated to generating the transmitted CW signal and $RFIC_2$ is dedicated to generating the CW receive signal. In an alternative embodiment, BPSK modulation is performed on the local oscillator (LO) signal in the transmitting module receiving the reference.

In another embodiment of the present invention, the transmitting chip conveys the reference to the other chips using BPSK modulation on a snapshot-by-snapshot basis. One snapshot is taken with the reference sent at regular polarity and the other at opposite polarity. The two snapshots are summed for the regular signal and subtracted for the reference signal. The snapshot can be halved in time to maintain same resolution bandwidth (RBW). In a related embodiment, BPSK modulation is implemented through software polarity toggling at the transmitting module (software-based toggling avoids injecting noise).

In a further embodiment, the transmitting RFIC sends to the receiving RFIC the receive local oscillator (RX_LO) as a reference rather than the transmitted signal. The receiving RFIC is configured to a RX_LO' frequency which is offset from both the transmitted signal and the RX_LO frequency. In a non-limiting example, the transmitting frequency is 10.010 GHz, RX_LO is 10.008 GHz and RX_LO' is 10.007 GHz. Then the transmitting RFIC will receive the transmission at 2 MHz, while the receiving RFIC will receive the transmission at 3 MHz and RX_LO at 1 MHz by digitally downconverting the 3 MHz with the received 1 MHz downconverted RX_LO signal. In practice, this is done by multiplying the downconverted 3 MHz samples with conjugate of downconverted 1 MHz samples. Because there is no signal conveyed to the receiving RFIC at the transmitting frequency, the measurement of the signal from the DUT is not contaminated by leakage.

In the above example, if RX_LO' is higher in frequency than RX_LO (e.g. LO_RX is 10.007 GHz and RX_LO' is 10.008 GHz) the reference is converted to a "negative frequency" ("−1 MHz"), and during the reconstruction no conjugation is needed.

In respective related embodiments, the above cases extend to arbitrary numbers of multiple receive RFICs. Since only one RFIC transmits at any given time, the processed reference signals are distributed to the other RFICs.

In further embodiments of the present invention, simultaneous transmission is done from multiple RFICs. In a related embodiment, staggered frequencies (by an order of RBW) are used, where the RBW frequency offset does not unsatisfactorily degrade the measurement.

Other embodiments provide BPSK manipulation of the transmitted signals in cases where multiple reference signals need to be distributed. In a related embodiment, BPSK encoding (such as by Hadamard matrix rows) of transmission signals are used to distinguish between the multiple reference signals. In this embodiment, the encodings of the references signals of the RFICs are mutually orthogonal and thus distinguishable. The BPSK code [11 . . . 1] is not used, to avoid contaminating the transmitted signal.

A further related embodiment provides multiple RX_LO frequencies, so that the mixed frequency differences are distinct. In a non-limiting example, 4 RFICs with RX_LO frequencies of $F_0$, $F_0$+df, $F_0$+3df and $F_0$+4df, respectively, can be used. The df coefficients 0, 1, 3, and 4 are chosen to avoid overlaps caused by the oscillator ±mixing. That is. $RFIC_1$ will receive at frequencies +df, +3df and +4df, $RFIC_2$ will receive the references at −df, +2df and +3df, etc., such that all absolute values are distinct. The scheme can be further extended—for example for 8 RFICs the frequency offsets could be [0,1,3,4,9,10,12,13]df. This technique can be used in conjunction with using the same frequency for transmission and as a local oscillator in each module (such as in FMCW, CW or stepped CW radar), so that each module can receive all the rest of the modules and distinguish between their signals, both in the reference path and in the over-the-air path.

Another embodiment provides orthogonal multiplexing for multi-module operation when several modules are transmitting. This embodiment achieves not only the benefits of reference signal isolation, but also a time- and memory-efficient multiple operation per sweep, such as for a multi-static radar application.

An additional embodiment of the present invention further provides a solution to a problem which arises when demodulating a received signal with a signal derived from the same LO as the transmitted signal. Any spur or artifact situated about the LO contributes to an effective noise floor. Examples of such artifacts include: the image components associated with quadrature modulation imbalance and reference spurs situated about the LO. According to this embodiment of the invention, the problem may be avoided in the multi-module case by shifting the LO of each module relative to all others, thus also shifting the associated artifacts. A further embodiment of the present invention circumvents the need to send a replica of the transmitted signal to the receiving module. Conveying a replica of the transmitted signal to the receiving module allows characterizing the relative phase between the reference signal path and the signal path through the device or medium under test by measuring the relative phase of intermediate frequency signals resulting from the mixing of the received signal with a local oscillator. However, any leakage of the replica of the transmitted signal in the receiver can contaminate the received signal. A related embodiment of the present invention avoids this problem by avoiding sending a replica of the transmitted signal to the receiving module. Instead, this embodiment provides a replica of the receiving module's local oscillator (LO) back to the transmitting module. The transmitting module then locally mixes (via a dedicated downconverter) the receiving module's LO with the transmitted signal, thereby generating an intermediate frequency (IF) at the transmitter. This transmitter intermediate frequency signal is indicative of the relative phase between the transmitted signal and the receiver's intermediate frequency signal. By performing this operation in the transmitting module rather than in the receiving module, this embodiment guarantees that only the transmitted signal passing through the DUT reaches the receiving module, and that no other signal at same frequency is present there.

What is claimed is:

1. A Radio-Frequency (RF) transmit-receive system comprising:
   a plurality of RF transmit-receive modules, wherein each RF transmit-receive module includes:
      a calibration reference signal transmit port; and
      a calibration reference signal receive port;
   a passive multi-port coupler having a plurality of reference signal input ports and a plurality of reference signal output ports, wherein signals input to the passive multi-port coupler are distributed among signals output from the passive multi-port coupler;
and wherein:
   each calibration reference signal transmit port of a module is connected to an input port of the passive multi-port coupler;
   each calibration reference signal receive port of a module is connected to an output port of the passive multi-port coupler; and
   at least one transmit-receive module is operative to receive a calibration reference signal transmitted by another transmit-receive module.

2. The RF transmit-receive system of claim 1, wherein the passive multi-port coupler is an all-to-all passive coupler.

3. The RF transmit-receive system of claim 1, wherein the at least one transmit-receive module is operative to receive simultaneous calibration reference signals transmitted by more than one other transmit-receive module.

4. The RF transmit-receive system of claim 1, wherein each module of the plurality of modules is operative to receive calibration reference signals transmitted by another transmit-receive module.

5. The RF transmit-receive system of claim 4, wherein each module of the plurality of modules is operative to receive calibration reference signals simultaneously transmitted by more than one other transmit-receive module.

6. The RF transmit-receive system of claim 1, wherein at least one transmit-receive module includes a bidirectional RF calibration port.

7. The RF transmit-receive system of claim 6, wherein each transmit-receive module of the plurality of transmit-receive modules includes a bidirectional RF calibration port.

8. The RF transmit-receive system of claim 7, wherein the bidirectional RF calibration port of each transmit-receive module is connected to a bidirectional port of the passive multi-port coupler.

9. The RF transmit-receive system of claim 1, wherein the passive multi-port coupler includes at least one bidirectional port.

10. The RF transmit-receive system of claim 9, wherein each port of the passive multi-port coupler is a bidirectional port.

11. The RF transmit-receive system of claim 1, wherein the passive multi-port coupler is a star coupler.

12. The RF transmit-receive system of claim 11, wherein the star coupler is a resistive star coupler.

13. The RF transmit-receive system of claim 1, wherein the passive multi-port coupler includes a multi-port combiner connected to a multi-port splitter.

14. The RF transmit-receive system of claim 1, wherein the passive multi-port coupler includes a plurality of hybrid couplers, wherein each hybrid coupler has at least two input ports and at least two output ports.

15. The RF transmit-receive system of claim 14, wherein:
   for each hybrid coupler, each input port thereof accepts a signal selected from a group consisting of:
      a signal input to the multi-port passive coupler; and
      a signal output from a different hybrid coupler;
   and wherein:
   for each hybrid coupler, each output port thereof provides a signal selected from a group consisting of:
      a signal input to a different hybrid coupler; and
      a signal output from the multi-port passive coupler.

16. The RF transmit-receive system of claim 15, wherein the hybrid couplers are hybrid 2-by-2 couplers.

17. The RF transmit-receive system of claim 16, wherein:
   for each hybrid coupler, each input port thereof accepts a signal selected from a group consisting of:
      a signal input to the multi-port passive coupler; and
      a signal output from a different hybrid coupler;
   and wherein:
   for each hybrid coupler, each output port thereof provides a signal selected from a group consisting of:
      a signal input to a different hybrid coupler; and
      a signal output from the multi-port passive coupler;
   and wherein:
      no hybrid coupler has both inputs connected to the same hybrid coupler; and
      no hybrid coupler has both outputs connected to the same hybrid coupler.

18. The RF transmit-receive system of claim 1, wherein signals input to the passive multi-port coupler are distributed substantially equally among signals output from the passive multi-port coupler.

19. The RF transmit-receive system of claim 1, wherein signals input to the passive multi-port coupler are distributed among signals output from the passive multi-port coupler such that the distributed signals are within 3 dB of one another.

\* \* \* \* \*